Jan. 8, 1924.
H. ALPERS
1,480,039
REED MUSICAL INSTRUMENT
Filed Feb. 13, 1922    3 Sheets-Sheet 3
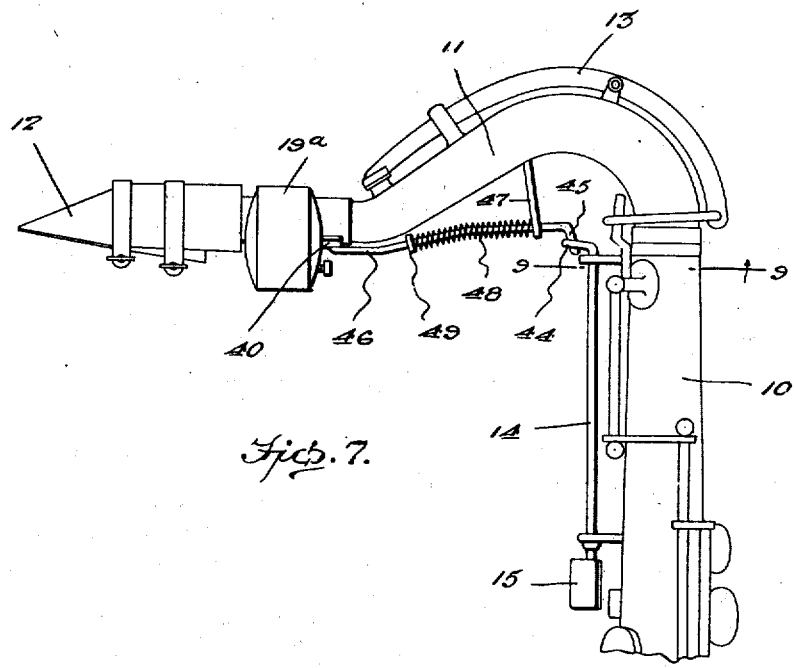

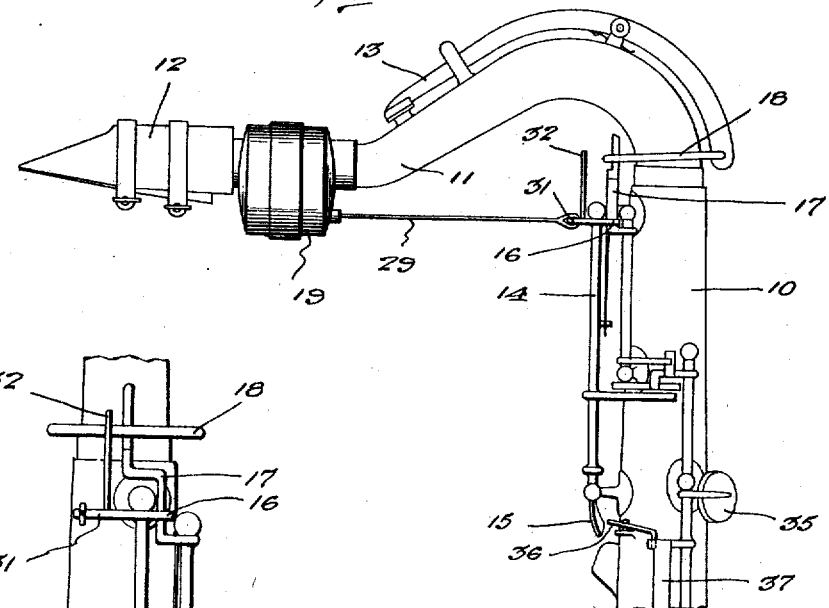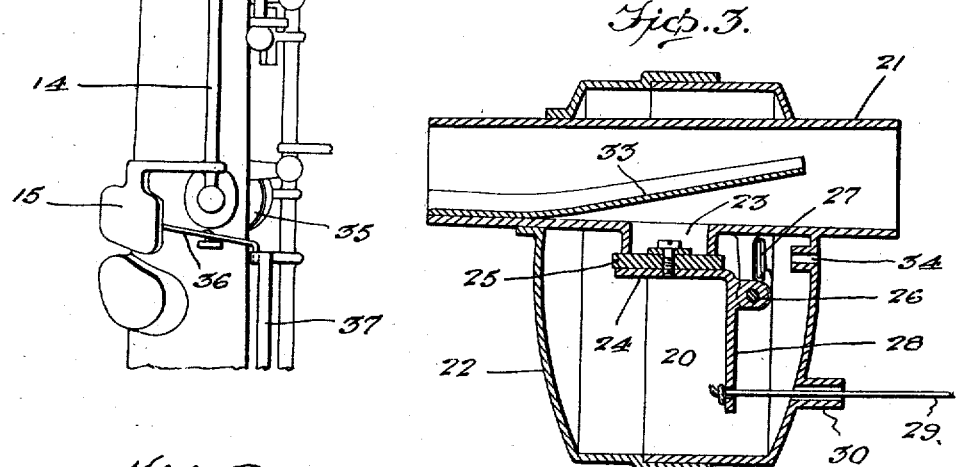

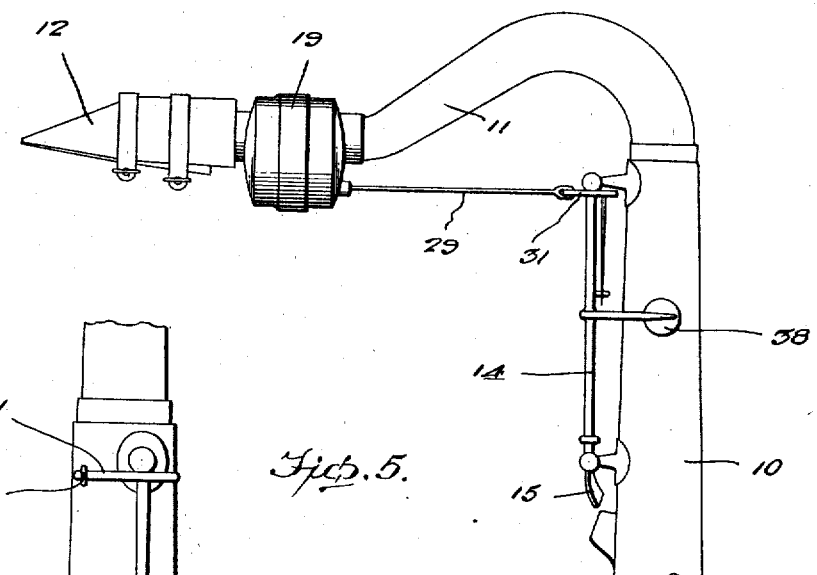
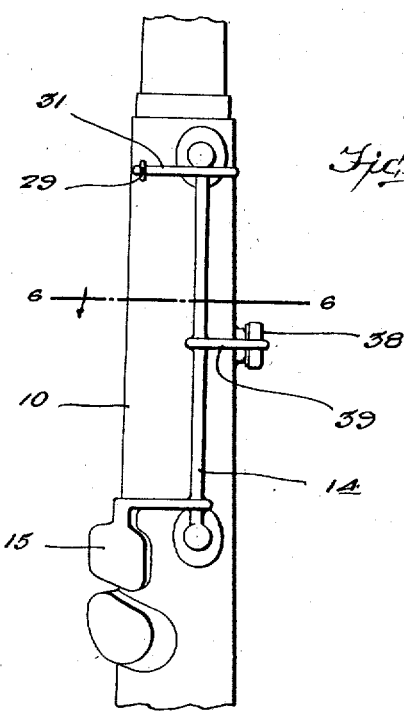
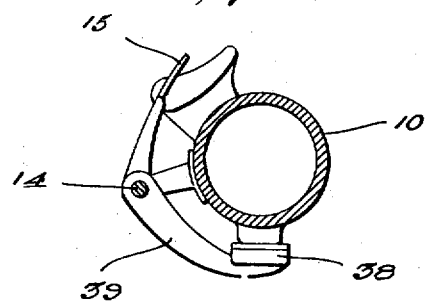

Patented Jan. 8, 1924.

1,480,039

UNITED STATES PATENT OFFICE.

HENRY ALPERS, OF COLUMBUS, NEBRASKA.

REED MUSICAL INSTRUMENT.

Application filed February 13, 1922. Serial No. 536,226.

*To all whom it may concern:*

Be it known that I, HENRY ALPERS, a citizen of the United States, residing at Columbus, in the county of Platte and State of Nebraska, have invented new and useful Improvements in Reed Musical Instruments, of which the following is a specification.

This invention relates to improvements in reed musical instruments and is in part a continuation of a pending application filed by me July 18, 1921, and bearing the Serial No. 485,480.

The invention is especially designed for use upon a saxophone, whereby the range of notes played may be increased, the invention further permitting certain notes to be played without the use of individual keys, so that these keys may be eliminated and fingering of the instrument thus simplified.

Another object of the invention is the provision of means as above set forth, which may be manufactured in connection with the instrument, or may be separately manufactured and afterward attached.

With the above and other objects in view, the invention further includes the following novel features and details of construction, to be hereinafter more fully described, illustrated in the accompanying drawings and pointed out in the appended claims.

In the drawings:—

Figure 1 is an elevation of the upper portion of a saxophone and illustrating the invention.

Figure 2 is a view at right angles to Figure 1 with the neck and mouth piece broken away.

Figure 3 is an enlarged detail sectional view taken longitudinally of the neck of the instrument and showing the invention detached.

Figure 4 is a view similar to Figure 1 showing a modified construction of the invention.

Figure 5 is a view similar to Figure 2 but illustrating the subject matter of Figure 4.

Figure 6 is a transverse sectional view on the line 6—6 of Figure 5.

Figure 7 is a view similar to Figure 1 showing a different valve arrangement.

Figure 8 is a fragmentary sectional view taken longitudinally through the neck of the instrument shown in Figure 7.

Figure 9 is a section on the line 9—9 of Figure 7.

Referring in detail to the drawings, and more especially to the form of the invention shown in Figures 1, 2 and 3, the body of the saxophone is indicated at 10, the neck at 11, and the mouth piece at 12, while the second octave key is shown at 13. This key may be operated in the usual manner, that is by means of a spring actuated rock shaft 14 having a finger piece 15 and an arm 16, the latter controlling the operation of a spring offset arm 17. The arm 17 extends within a ring 18 which is secured to one end of the second octave key 13 and when the finger piece 15 is depressed to release the arm 17, the latter will act to engage the ring 18 and open the second octave key against the action of its spring. All of the foregoing is of the usual well known construction.

The invention includes a casing 19 which is located upon the neck of the instrument between the mouth piece 12 and the second octave key 13, the said casing providing an enlargement of the neck, or a chamber 20 having communication with the interior of the neck. Extending through the chamber 20 is a tube 21 and this tube may form a portion of the neck 11, or it may be separately made as shown in the drawings with one end extending beyond the end of the chamber 12 to telescope over the end of the neck 11, and the opposite end extended to receive the mouth piece 12. The casing 19 which provides the chamber is preferably formed in separate sections, one of which is attached to the tubular member 21 while the other is slidable along said member and provides a removable closure 22 for the chamber. The tubular member 21 is provided with an opening 23 whereby communication between the neck of the instrument and the chamber 20 may be established. This opening is controlled by a valve, which in Figure 3 of the drawings is shown as a pivotally movable or hinged valve 24 having a compressible disk or washer 25 for engagement over the opening 23. The valve is pivotally mounted as shown at 26 and is yieldingly held in normal position by means of a spring 27. An arm 28 is connected to the valve 24 and this arm has secured thereto one end of a connecting member 29. This connecting member may be either in the form of a flexible element or cord passing through an opening 30 provided in the casing 19, or it may be in the form of a wire or rod. In the latter event the opening 30 will be suitably lined to prevent vibration.

The opposite end of the connecting member 29 is connected to the rock shaft 14 and for this purpose, the said shaft is provided with an arm 31 which extends in a direction opposite to the arm 16 and is provided with a right angularly disposed finger 32, to which the member 29 is secured. This finger 32 serves a two-fold purpose, namely, to provide means for connection with one end of the member 29 and to provide means for actuating the second octave key 13 to move the latter to a closed position.

It will be seen from the foregoing description and the accompanying drawings, that a rocking movement of the rod 14 will first serve to open the second octave key 13 so as to permit the instrument to be played in the usual manner. By the use of this key however, notes only as high as F in the third octave may be played. With the use of the invention however notes above F in the third octave may be played and the range of the instrument may be increased to high C in the third octave.

In order to play notes above F in the third octave, the finger piece 15 is further depressed so that the finger 32 will engage the ring 18 and move the second octave key to a closed position and at the same time open the valve 24 so as to permit of the passage of air through the opening 23 into the chamber 20 and outward through the neck.

Located within the tubular member 21 is an upwardly inclined channel member 33, which extends upwardly across the opening 23. This channeled member is relatively wide at its lower end and converges to a comparatively narrow restricted passage. Moisture entering the tubular member 21 will thus be directed upward across the opening 23 without passing through said opening into the chamber 20. Should however any moisture enter this chamber, it may pass outward through the opening 30, or through an additional opening 34 provided in the casing 19.

In addition to operating the second octave key 13 and the valve 24, the rock shaft 14 or its finger piece 15 will also act to operate one of the usual instrument pads 35. For this purpose there is provided a finger 36 which has one end connected to a bar 37 which actuates the pad 35 in the usual manner and its opposite end extending beneath the finger piece 15, so that when the latter is depressed it will actuate the bar 37 and raise the pad 35.

While the invention is primarily designed to increase the range of notes played on the instrument, it also permits of the playing of the notes D, E flat, E natural and F natural and the pads ordinarily used for these notes may be eliminated so that notes from C to C in the third octave may be played by opening the valve 24. In addition, notes in the second octave may be played without the use of a second octave key and this key may also be eliminated. To accomplish this, the first octave key which is indicated at 38 in Figures 4, 5 and 6 of the drawings is moved to the opposite side of the rock shaft 14 which is previously occupied. The purpose of this is to permit this key 38 to be opened simultaneously with the opening of the valve 24 and for this purpose the said key 38 is connected to the shaft 14 by means of an arm 39. The finger piece 15 may thus first be depressed to raise the pad 38, while a further pressure will open the valve 24 with the key 38 remaining open and permit of the playing of notes in the second and third octave without the use of a second octave key.

In Figures 7, 8 and 9 of the drawings, the construction is substantially the same as that shown in Figures 1, 2 and 3, the casing 19ᵃ being provided with a tubular member 21ᵃ passing therethrough for engagement with the neck 11 of the saxophone. This tubular member 21ᵃ has an opening 23ᵃ therein and this opening is controlled by a slide valve 40 which is moved longitudinally of the member 21ᵃ and is guided between the said tubular member and a sleeve 41 extending within the chamber 20ᵃ. The slide valve 40 is of arcuate cross sectional shape so as to lie snugly against the outer surface of the tubular member 21ᵃ and is yieldingly held in this position by means of a spring 42. The casing 19ᵃ is provided with a drain opening which may be normally closed by a screw plug 43.

The valve 40 is operated by means of the rock shaft 14 and for this purpose the said shaft is provided with an arm 44 which is adapted to engage a substantially right angularly disposed arm 45 located at the end of a rod 46. The opposite end of this rod 46 is secured to the slide valve 40. The rod 46 is guided in a bearing 47 secured to the neck of the saxophone and is surrounded by a spring 48, the latter having one end contacting with the bearing 47 and its opposite end contacting with a collar 49 secured to the rod 46. In this form of the invention, the shaft 14 is in communication with the second octave key 13, the latter remaining closed during the use of the valve 40 and being opened in the usual manner during the ordinary playing of the instrument.

The invention is susceptible of various changes in its form, proportions and minor details of construction and the right is herein reserved to make such changes as properly fall within the scope of the appended claims.

Having described the invention what is claimed is:—

1. The combination with a saxophone, of a casing, a tube extending through and beyond each end of the casing for connection with the neck and mouth piece of the instrument, said tube having an opening therein for communication with the interior of the casing, a valve located within the casing to control such communication and means whereby the valve may be operated.

2. A saxaphone having an enlarged neck defining a chamber having communication with the interior of the neck, a valve controlling such communication, means whereby the valve may be operated and means included in the valve operating means for controlling the operation of an octave key.

3. The combination with a reed musical instrument having an octave key and means for operating the key, of an enlargement in the neck of the instrument, said enlargement defining a chamber having communication with the interior of the neck, means for controlling such communication, means operated by the octave key operating means for opening the valve and means whereby the octave key will be closed when the valve is opened.

4. The combination with a reed musical instrument having an octave key and means for operating the key, of an enlargement in the neck of the instrument, said enlargement defining a chamber having communication with the interior of the neck, means for controlling such communication, means operated by the octave key operating means for opening the valve and means included in the octave key operating means for closing the octave key when the valve is opened.

5. The combination with a C melody saxaphone, of means including a valve controlled chamber having communication with the interior of the neck of the instrument, whereby notes above F in the third octave may be played.

6. The combination with a C melody saxaphone, of means including a valve controlled chamber having communication with the interior of the neck of the instrument, whereby notes from C to C in the third octave may be played.

7. A C melody saxaphone having an enlarged neck defining a chamber having communication with the interior of the neck, a valve controlling such communication, means for controlling the operation of the valve and means included in the valve controlling means for simultaneously operating an octave key, whereby notes from A in the second octave to C in the third octave may be played.

8. A saxaphone embodying a chamber extending around the neck of the instrument between the mouth piece and keys and communicating with the interior of said neck and means for controlling such communication to increase the range of notes.

9. In a saxaphone, a casing, a tubular member extending through said casing for attachment to and communication with the instrument, said tubular member having an opening therein within the casing, a normally seated valve for closing said opening and means located upon the outside of the casing for operating the valve to admit air into the casing to increase the range of notes.

10. In a saxaphone, a casing, a tubular member extending through the casing for attachment to and communication with the wind passage of the instrument, said tubular member having an opening therein within the casing, a normally seated valve for closing said opening and means controlled by one of the keys of the instrument, whereby the valve may be operated to admit air into the casing to increase the range of notes.

11. A saxaphone having an enlarged portion defining a chamber having communication with the interior of the neck, a valve controlling such communication, means whereby the valve may be operated and a moisture conveyor located within the tube of the saxaphone to prevent the passage of moisture into the chamber.

12. A saxaphone having an enlarged neck defining a chamber having communication with the interior of the neck, a valve controlling such communication, means whereby the valve may be operated and an upwardly inclined channel shaped moisture conveyor located within the tube of the saxaphone to prevent the passage of moisture into the chamber.

In testimony whereof I affix my signature.

HENRY ALPERS.